US006601798B2

(12) United States Patent
Cawley

(10) Patent No.: US 6,601,798 B2
(45) Date of Patent: *Aug. 5, 2003

(54) SEAT TRACK MOUNTED PASSENGER INTERFACE

(75) Inventor: John Edward Cawley, San Pedro, CA (US)

(73) Assignee: The Boeing Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/943,707

(22) Filed: Aug. 31, 2001

(65) Prior Publication Data

US 2002/0195523 A1 Dec. 26, 2002

Related U.S. Application Data

(60) Provisional application No. 60/301,010, filed on Jun. 26, 2001.

(51) Int. Cl.[7] .............................................. B64D 25/04
(52) U.S. Cl. .................. 244/118.6; 244/118.5
(58) Field of Search ........................ 244/118.5, 118.6; 291/411.2, 411.45, 417.3

(56) References Cited

U.S. PATENT DOCUMENTS

| 3,553,675 | A | * | 1/1971 | Shaver et al. ............. 174/70 R |
|---|---|---|---|---|
| 4,428,078 | A | * | 1/1984 | Kuo ........................... 455/3.06 |
| 4,727,569 | A | * | 2/1988 | Kutrieb et al. .............. 235/380 |
| 4,736,452 | A | * | 4/1988 | Daniels et al. ................ 455/41 |
| 4,763,360 | A | * | 8/1988 | Daniels et al. ............. 455/3.06 |
| 4,774,514 | A | * | 9/1988 | Hildebrandt et al. ........ 340/3.71 |
| 4,853,555 | A | * | 8/1989 | Wheat ......................... 307/9.1 |
| 4,958,381 | A | * | 9/1990 | Toyoshima ................ 340/3.41 |
| 5,359,349 | A | * | 10/1994 | Jambor et al. .............. 248/918 |
| 5,409,186 | A | * | 4/1995 | Chow .......................... 165/41 |
| 5,529,265 | A | * | 6/1996 | Sakurai ................... 244/118.5 |
| 5,769,369 | A | * | 6/1998 | Meinel .................... 248/176.1 |
| 5,795,018 | A | * | 8/1998 | Schumacher et al. .... 244/118.5 |
| 5,807,177 | A | * | 9/1998 | Takemoto et al. ...... 273/148 B |
| 5,848,367 | A | * | 12/1998 | Lotocky et al. ............... 701/36 |
| 5,984,415 | A | * | 11/1999 | Schumacher et al. .... 244/118.5 |
| 6,038,426 | A | * | 3/2000 | Williams, Jr. ................ 725/77 |
| 6,058,288 | A | * | 5/2000 | Reed et al. ................ 455/3.06 |
| 6,158,793 | A | * | 12/2000 | Castro ........................ 296/1.1 |
| 6,179,381 | B1 | * | 1/2001 | Gevaert .................... 297/217.3 |
| 6,249,913 | B1 | * | 6/2001 | Galipeau et al. ............ 700/295 |

FOREIGN PATENT DOCUMENTS

| EP | 1078852 | | 2/2001 | |
| EP | 1078852 A2 | * | 2/2001 | ........... B64D/11/06 |

* cited by examiner

Primary Examiner—Charles T. Jordan
Assistant Examiner—Stephen A. Holzen
(74) Attorney, Agent, or Firm—Harness Dickey & Pierce P.L.C.

(57) ABSTRACT

A seat track mounted passenger interface device is provided. The device includes a base removably coupled to an aircraft seat track. A riser coupled to the base extends generally vertically away from the seat track. An interface head coupled to the distal end of the riser is located adjacent a passenger seat bottom cushion. One or more jacks and/or sockets are disposed within the interface head. Electrical leads interconnect the jacks and/or sockets with a power source. The electrical leads extend from the interface head, through the riser and base, and then through the seat track raceway.

23 Claims, 2 Drawing Sheets

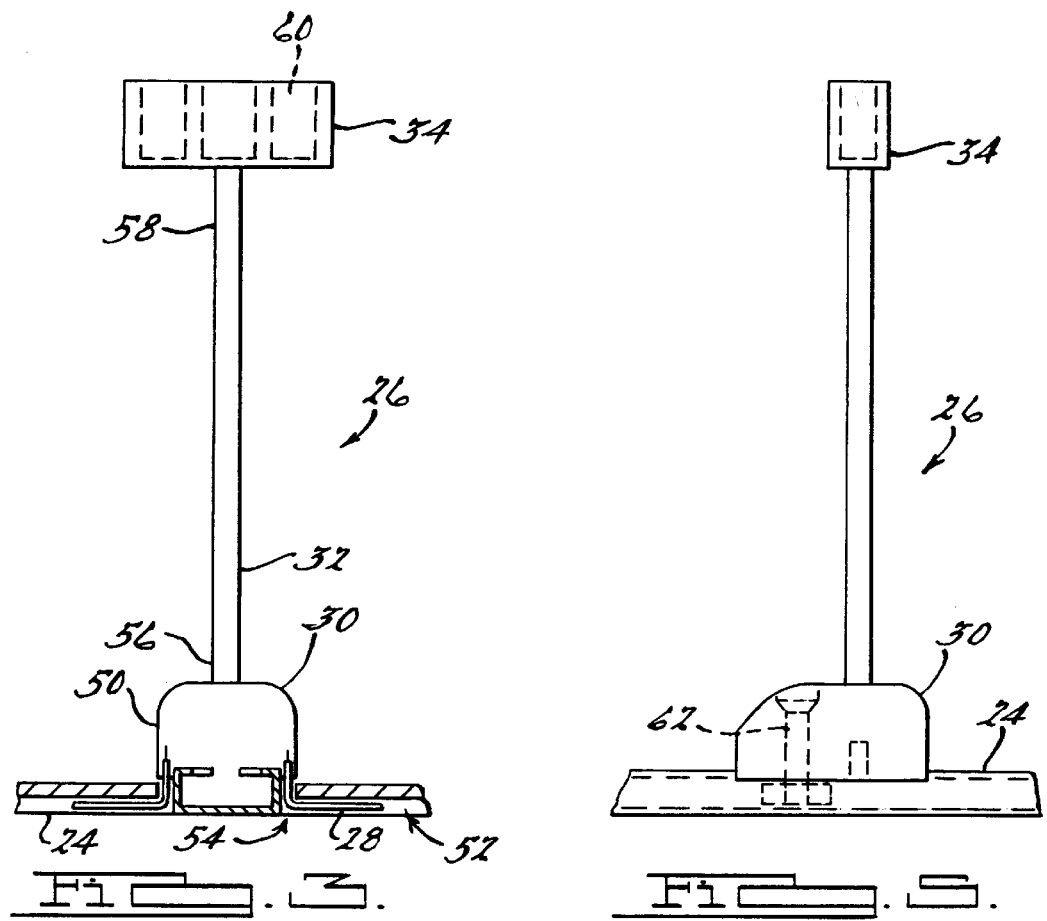
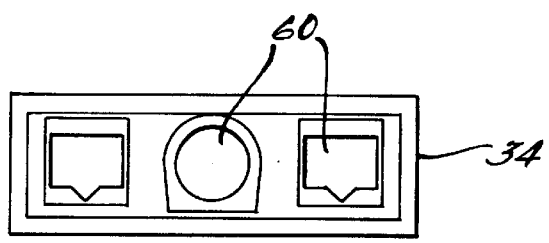

SEAT TRACK MOUNTED PASSENGER INTERFACE

CROSS-REFERENCE TO RELATED APPLICATIONS

This application claims the benefit of U.S. Provisional Application No. 60/301,010, filed Jun. 26, 2001.

FIELD OF THE INVENTION

The present invention relates to aircraft based electronic systems and, more particularly, to a seat track mounted passenger interface device.

BACKGROUND OF THE INVENTION

Aircraft seats often include various passenger interface devices mounted therein. For example, laptop computer power and interface units, audio reception and control units, and associated electronics are commonly mounted within the aircraft seats. Most of the control units, power sockets, and the like are located within the seat arms.

On new aircraft, this type of electronic equipment configuration is certified as part of the seat certification process. Most attempts to modify or add such seat-based electronic equipment to existing aircraft requires re-certification of the seats. This process can be costly and time consuming. Further, the removal and re-installation of aircraft seats to effect the modification is also time-consuming. As such, airline customers are sometimes reluctant to accept seat modifications.

In view of the foregoing, it would be desirable to provide an airline passenger interface device without modifying or requiring re-certification of the aircraft seats.

SUMMARY OF THE INVENTION

The above and other objects of the present invention are provided by a seat track mounted passenger interface device. The device includes a base removably coupled to the aircraft seat track. A riser coupled to the base extends generally vertically away from the seat track. An interface head coupled to the distal end of the riser is located adjacent a passenger seat bottom cushion. One or more jacks and/or sockets are disposed within the interface head. Electrical leads interconnect the jacks and/or sockets with a power source. The electrical leads extend from the interface head, through the riser and base, and then through the seat track raceway.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a front cross-sectional view of the passenger interface device of the present invention;

FIG. 4 is a top view of a portion of the passenger interface device of FIG. 3; and FIG. 5 is a side view of the passenger interface device of FIG. 3.

DETAILED DESCRIPTION OF THE PREFERRED EMBODIMENTS

The following description of the preferred embodiments is merely exemplary in nature and is in no way intended to limit the invention, its application, or uses.

The present invention is directed towards an airline passenger interface which is entirely separate from, and requires no modification of, the aircraft seats. The device includes a compact base that locates and locks into standard aircraft seat tracks. A riser tube is attached to the base and supports an interface head. The head is preferably positioned within reach of a seated passenger, such as just below and between the seat cushions.

The interface head includes one of several different jack and socket options, depending upon aircraft customer preferences. For example, data ports, auxiliary power outlets, as well as audio and control units may be provided. Cabling for each interface is routed through the seat track raceway and enters the base of the riser from either side of the seat track. The device is designed to be quickly and easily removed and replaced for maintenance purposes. The device can also be readily moved to accommodate seat re-pitching.

Figure 1:
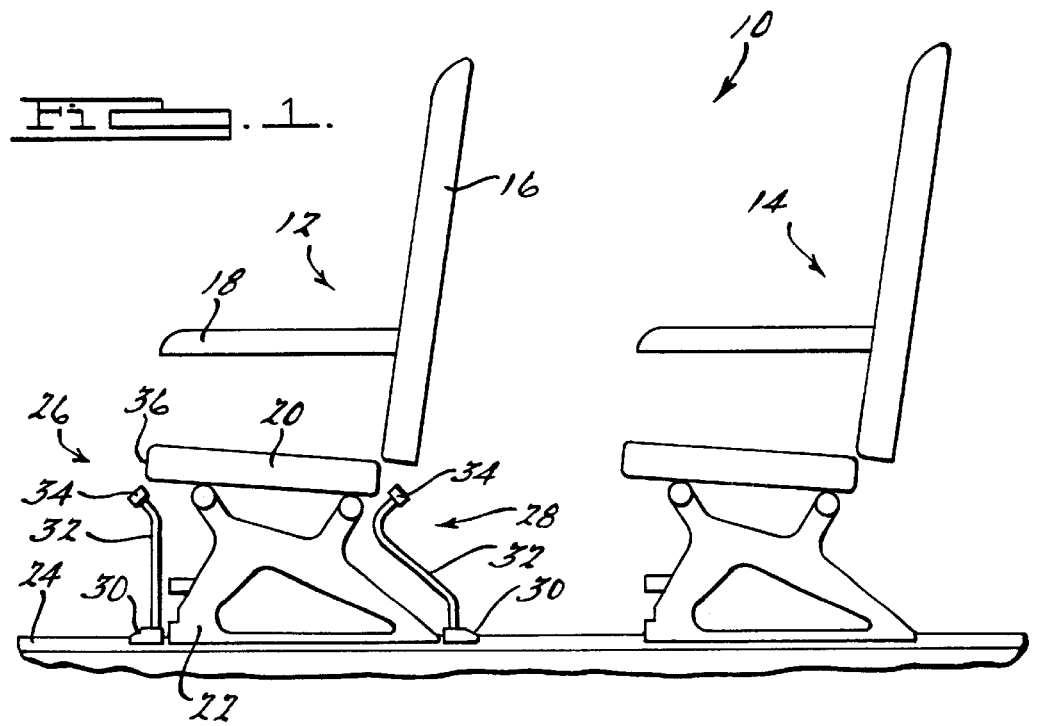
FIG. 1 is a schematic side view of an aircraft seating arrangement incorporating the teachings of the present invention.

Turning now to the drawing figures, FIG. 1 illustrates an aircraft seat arrangement generally at 10. Although in a commercial embodiment of the present invention numerous seating units would make up the seat arrangement 10, the seat arrangement 10 illustrated in FIG. 1 includes a pair of seating units 12 and 14. The seat unit 12 includes a seat back 16, a seat arm 18, and a seat bottom 20. The seat unit 12 also includes a rigid frame 22 supporting the remainder of the seating components. The frame 22 is connected at an upper end to the seat bottom 20 and at a lower end to a floor mounted seat track 24. Although a description of the seat unit 14 is omitted, one skilled in the art will appreciate that the seat unit 14 is preferably identical to the seat unit 12.

The seat unit 12 and seat track 24 are standard original equipment and are basically uniform throughout the aircraft industry. Advantageously, the seat track 24 includes a plurality of longitudinally spaced apart mounting receptacles (not shown) formed therein. The mounting receptacles enable the seating units 12 and 14 to be positioned at various positions along the seat track 24 and at various positions relative to one another. Also advantageously, the seat track 24 is formed of a rigid material such as metal which enhances its ability to serve as a mounting platform.

The seat track 24 provides a novel location for mounting a pair of passenger interface devices 26 and 28. The passenger interface devices 26 and 28 include a base 30 mounted to the seat track 24, a riser 32 connected to the base 30, and an interface head 34 connected to the riser 32. The interface device 26 is located slightly forward of the seat frame 22 yet under the seat bottom 20. This enables the interface head 34 to be located within easy reach of a seated passenger (not shown) just in front of and beneath the forward edge 36 of the seat bottom 20. Alternatively, the interface device 28, which is designed for use by an occupant of the seating unit 14, is located just behind the frame 22 of the seat unit 12. As such, the interface head 24 of device 28 is located within easy reach of a seated passenger (not shown) just under the seat back 16 and proximate the rear lower edge of the seat bottom 20 of the adjacent seat unit 12.

Figure 2:
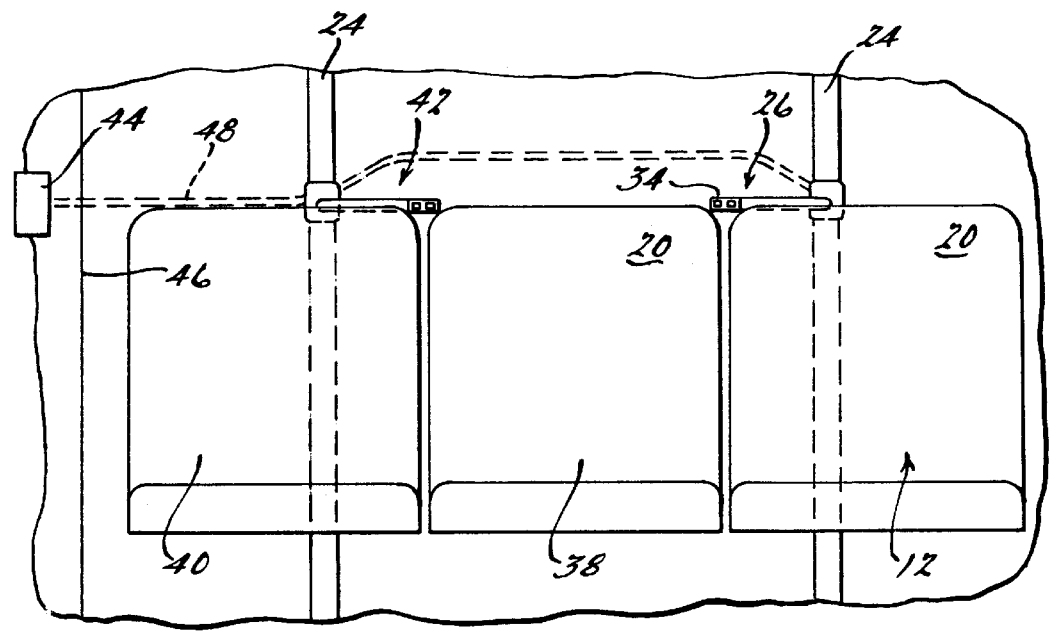
FIG. 2 is a schematic top view of a portion of the aircraft seating arrangement of FIG. 1.

Referring now to FIG. 2, a top view of the seat unit 12 is illustrated along side of additional seating units 38 and 40. As can be seen, the interface device 26 is offset or angled relative to seat track 24 by arcuate portions so as to position the interface head 34 between adjacent seat bottoms 20. Further, another interface device 42 is located within the row of seat units 12, 38, and 40 so that more than one passenger can interface simultaneously.

A power supply router 44 is mounted within the cabin wall 46. The router 44 interconnects a power supply (not shown) and the interface devices 26 and 42. To accomplish this, an electrical cable 48 extends from the router 44, through the seat track raceway (See FIG. 3) to the interface devices 26 and 42.

Turning now to FIG. 3, the interface device 26 is illustrated in greater detail. The interface device 26 includes a metal or hard plastic, hollow, cup-shaped base 30 mounted over the seat track 24. The walls 50 of the base 30 are laterally spaced apart from the seat track 24. This enables the cable 28 to pass from the seat track raceway 52 through the gap 54 and into the base 30.

The preferably tubular riser 32 made of plastic or metal such as aluminum, is coupled to the base 30 at a proximal end 56 and to the interface head 34 at a distal end 58. The upstanding riser 32 extends generally vertically away from the base 30 and may include one or more arcuate portions for selectively positioning the interface head 34 within reach of a seated passenger (not shown). The riser 32 is preferably hollow to accommodate the cable 28 therein. If desired, the riser 32 may be made flexible to enable user desired reconfiguration. However, a rigid riser 32 may minimize the need for aircrew readjustment after each use.

Referring now also to FIG. 4, the interface head 34 includes a plurality of jacks and/or sockets 60. While the particular arrangement of jacks and sockets 60 can be tailored to meet user specific needs, examples of such jacks and sockets include data ports, auxiliary power units as well as, audio and control units. Of course, digital, serial, or parallel ports may substitute therefore. Further, although the interface head 34 is illustrated as having a rectangular configuration and the jacks/sockets 60 are illustrated in a single row, any number of geometric configurations could substitute therefore.

Turning now to FIG. 5, the base 30 is preferably slideably and removably secured to the seat track 24. To accomplish this, a spring biased mounting pin 62 may be used. In a locked state, the pin 62 is urged into engagement with the mounting receptacles (not shown) in the seat track 24. In an unlocked state, the pin 62 disengages the seat track 24 to enable the interface 26 to be slid along the seat track 24 or removed entirely therefrom. Alternatively, bolts may be used.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An interface device for an aircraft comprising:
    an interface base adapted to be coupled to a seat track unit disposed within said aircraft;
    an interface riser coupled to said interface base, said interface riser being a reconfigurable flexible tube; and
    an interface head coupled to said interface riser.

2. The interface device of claim 1 wherein said interface base further comprises a hollow cup-shaped member including wall members that are laterally spaced apart from said seat track upon coupling said base to said seat track.

3. The interface device of claim 1 further comprising an electrical cable extending through a raceway of said seat track and adapted to connect to said interface head.

4. The interface device of claim 3 wherein said cable extends through said base.

5. The interface device of claim 4 wherein said cable extends through said riser.

6. The interface device of claim 1 wherein said interface head includes at least one of a jack and a socket.

7. The interface device of claim 6 wherein said at least one of a jack and a socket includes one of a data port, an auxiliary power unit, and an audio control.

8. An aircraft seating arrangement comprising:
    a passenger compartment including a floor;
    a seat track longitudinally disposed on said floor relative to said passenger compartment;
    at least one seat including a frame, said frame being coupled to said seat track; and
    at least one passenger interface device coupled to said seat track at a position which is one of fore and aft of said frame.

9. The aircraft seating arrangement of claim 8 wherein said passenger interface device terminates at an interface head located adjacent a seat bottom of said at least one seat.

10. The aircraft seating arrangement of claim 9 wherein said interface head is located proximate a front lower edge of said seat bottom.

11. The aircraft seating arrangement of claim 9 wherein said interface head is located proximate a rear lower edge of said seat bottom.

12. An aircraft interface device comprising:
    a seat track mountable base;
    a cylindrical, hollow riser extending from said base; and
    an interface head coupled to a distal end of said riser and adapted to be located adjacent a lower edge of a seat bottom.

13. The interface device of claim 12 wherein said base further comprises a hollow cup-shaped member including wall members adapted to be laterally spaced apart from said seat track after said base is mounted to said seat track.

14. The interface device of claim 13 wherein said base and said tubular riser define a continuous volume adapted to accommodate a cable therein.

15. The aircraft seating arrangement of claim 8 wherein said at least one passenger interface device further comprises:
    a hollow cup-shaped base including wall members laterally spaced apart from said seat track;
    a tubular riser coupled to said interface base and projecting away from said floor; and
    an interface head coupled to a distal end of said interface riser.

16. The aircraft seating arrangement of claim 15 wherein said interface riser further comprises a cylindrical tube which is flexible.

17. The aircraft seating arrangement of claim 15 wherein said interface riser further comprises a cylindrical tube which is rigid.

18. The aircraft seating arrangement of claim 15 further comprising an electrical cable extending through a raceway of said seat track, between one of said wall members of said base and said seat track, through said hollow cup-shaped base, through said tubular riser and connected to said interface head.

19. The aircraft seating arrangement of claim 18 wherein said interface head is located adjacent a seat bottom of said at least one seat.

20. The aircraft seating arrangement of claim 19 wherein said interface head is located proximate a front lower edge of said seat bottom.

21. The aircraft seating arrangement of claim 19 wherein said interface head is located proximate a rear lower edge of said seat bottom.

22. The aircraft seating arrangement of claim 17 wherein said base is slidable along said seat track.

23. An interface device for an aircraft comprising:

a seat track unit disposed within said aircraft;

an interface base independently and directly coupled to said seat track unit;

an interface riser coupled to said interface base; and an interface head coupled to said interface riser.

\* \* \* \* \*